（12）United States Patent
Bray et al.

(10) Patent No.: US 8,869,579 B2
(45) Date of Patent: *Oct. 28, 2014

(54) SELF-SEALING FASTENER

(75) Inventors: Alan V. Bray, Spicewood, TX (US);
Denise Dama Deppe, Austin, TX (US);
Gary Schmidt, Austin, TX (US); John Lee Massingill, San Marcos, TX (US);
Pulinkumar Navinbhai Patel, Austin, TX (US); Clois E. Powell, Seguin, TX (US); Vijaykumar Madhawrao Mannari, Saline, MI (US)

(73) Assignee: Systems & Materials Research Corporation, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/340,414

(22) Filed: Dec. 29, 2011

(65) Prior Publication Data
US 2012/0121359 A1  May 17, 2012

Related U.S. Application Data

(63) Continuation of application No. 12/034,636, filed on Feb. 20, 2008, now Pat. No. 8,092,128.

(60) Provisional application No. 60/902,176, filed on Feb. 20, 2007.

(51) Int. Cl.
*B21C 23/24* (2006.01)
*F16B 19/00* (2006.01)
*F16B 1/00* (2006.01)

(52) U.S. Cl.
CPC .............. *F16B 19/008* (2013.01); *F16B 1/0071* (2013.01)

USPC ................................ 72/46; 411/82.3; 470/28

(58) Field of Classification Search
USPC ......... 72/46, 47; 470/8, 9, 10, 27, 28; 411/82, 411/82.2, 82.3; 525/535; 528/25, 28, 373, 528/290
See application file for complete search history.

(56) References Cited

U.S. PATENT DOCUMENTS 2,466,963 A   4/1949  Patrick et al.
2,775,917 A   1/1957  Ferguson
(Continued)

FOREIGN PATENT DOCUMENTS

FR   2064220    7/1971
GB   1253020    11/1971
JP   02036220   2/1990

OTHER PUBLICATIONS

International Search Report from PCT/US2011/058959 dated Jun. 28, 2012, 13 pgs.

(Continued)

*Primary Examiner* — Edward Tolan
(74) *Attorney, Agent, or Firm* — David D. Griner; Abel Law Group, LLP

(57) ABSTRACT

A fastener suitable for use in airplane manufacture or repair that is coated with a pre-mixed moisture cure sealant. The sealant layer is coated with a frangible moisture barrier that will break apart when the fastener is installed, thus exposing the sealant to atmospheric moisture. Once exposed to moisture, the sealant will begin to cure. Preferred embodiments also provide a moisture indicator that provides a visual indication that the outer moisture resistant layer has been damaged.

20 Claims, 12 Drawing Sheets

(56) References Cited

U.S. PATENT DOCUMENTS

| | | | |
|---|---|---|---|
| 3,225,017 A * | 12/1965 | Seegman et al. | 528/373 |
| 3,275,579 A * | 9/1966 | Stierli et al. | 523/211 |
| 3,293,977 A * | 12/1966 | Stanley et al. | 411/501 |
| 3,317,461 A * | 5/1967 | Plueddemann | 528/25 |
| 3,397,178 A | 8/1968 | Shackelford et al. | |
| 3,401,146 A | 9/1968 | Kamal et al. | |
| 3,467,544 A | 9/1969 | Marinelli et al. | |
| 3,485,132 A | 12/1969 | Hanny et al. | |
| 3,489,599 A | 1/1970 | Krieble | |
| 3,639,137 A * | 2/1972 | Marinelli | 428/321.5 |
| 3,659,896 A * | 5/1972 | Smith et al. | 296/93 |
| 3,922,449 A | 11/1975 | Bolger | |
| 3,923,748 A | 12/1975 | Hutt et al. | |
| 4,012,984 A | 3/1977 | Matuschek | |
| 4,018,333 A | 4/1977 | Blackwood | |
| 4,092,293 A | 5/1978 | Harris et al. | |
| 4,428,982 A * | 1/1984 | Wallace | 427/202 |
| 4,443,567 A | 4/1984 | Sternisa et al. | |
| 4,519,974 A | 5/1985 | Bravenec et al. | |
| 4,556,591 A | 12/1985 | Bannink, Jr. | |
| 4,609,762 A | 9/1986 | Morris et al. | |
| 4,639,175 A | 1/1987 | Wollar | |
| 4,659,268 A | 4/1987 | Del Mundo et al. | |
| 5,193,958 A | 3/1993 | Day | |
| 5,249,898 A | 10/1993 | Stepanski et al. | |
| 5,304,023 A * | 4/1994 | Toback et al. | 411/387.3 |
| 5,792,388 A * | 8/1998 | Heitz et al. | 252/514 |
| 6,523,834 B2 | 2/2003 | Philipson | |
| 6,659,699 B2 | 12/2003 | Stoewer et al. | |
| 6,868,597 B2 | 3/2005 | Stevenson et al. | |
| 6,953,509 B2 | 10/2005 | Keener | |
| 7,017,255 B2 | 3/2006 | Wang et al. | |
| 7,021,153 B2 * | 4/2006 | Almanstoetter et al. | 73/761 |
| 7,134,666 B2 | 11/2006 | Beyssac et al. | |
| 7,645,840 B2 | 1/2010 | Zook et al. | |
| 7,721,996 B2 | 5/2010 | Gehrett et al. | |
| 7,786,226 B2 * | 8/2010 | Cosman | 525/535 |
| 7,900,412 B2 * | 3/2011 | West et al. | 52/394 |
| 8,092,128 B1 * | 1/2012 | Bray et al. | 411/82.3 |
| 2005/0148741 A1 | 7/2005 | Zook et al. | |
| 2006/0141242 A1 | 6/2006 | Keener | |
| 2008/0080954 A1 | 4/2008 | Snow et al. | |

OTHER PUBLICATIONS

Lakshmi N. Sridhar, Gupta, K. Rakesh, and Bhardwaj, Mohit, Barrier Properties of Polymer Nanocomposites, Feb. 18, 2006, pp. 8282-8289, vol. 45, Ind. Eng. Chem. Res.

Leslie, J. Clark and Michael A. Cosman, Use of Permapol P3.1 polymers and epoxy resins in the formulation of aerospace sealants, International Journal of Adhesion & Adhesives, 2003, pp. 343-348, vol. 23.

Glass, Richard S., A facile Synthesis of Trimethylsilyl Thioethers, Journal of Organometallic Chemistry, 1973, pp. 83-90, vol. 61.

* cited by examiner

SELF-SEALING FASTENER

CROSS-REFERENCE TO RELATED APPLICATIONS

This application is a Continuation Application of U.S. application Ser. No. 12/034,636, filed Feb. 20, 2008, which claims priority from U.S. Prov. Pat. App. No. 60/902,176, filed Feb. 20, 2007, which are hereby incorporated by reference.

STATEMENT REGARDING FEDERALLY SPONSORED RESEARCH OR DEVELOPMENT

This invention was made with Government support and the Government has certain rights in the invention.

TECHNICAL FIELD OF THE INVENTION

The present invention relates to fasteners, such as rivets and bolts, that are self-sealing as installed, more specifically to fasteners for use in aerospace manufacture and repair.

BACKGROUND OF THE INVENTION

In many aerospace applications, particularly airplane manufacture, whenever a rivet or other fastener will be installed in an assembly, a sealant must be applied around the fastener at the same time. Currently, aircraft sealants are two-part sealants that need to be mixed accurately and used within a certain amount of time. The mixed sealant is hand applied to fasteners and the "wet" fasteners are then installed. Excess sealant is wiped off and disposed of along with unused sealant.

The labor spent applying sealant to rivets and fasteners in aircraft manufacture and repair is a significant cost and time factor. To put the wasted time and effort into perspective, the C-17, the largest military aircraft currently in production, has over 1.4 million rivets and fasteners in each aircraft. It is estimated that there are on the order of 10 million wet installed fasteners going into military and commercial aircraft per year in the U.S. alone. Eliminating or greatly reducing the number of wet fastener installations could save tens of thousands of labor hours and millions of dollars on the manufacture of just one C-17 aircraft.

In addition, the process variability associated with "wet" installations is large. The amount of sealant applied, and areas of the rivet/fastener coated or uncoated vary widely with the installer. Excess sealant is often applied, resulting in additional time and expense for clean up of the excess sealant. Further, prior art wet installation creates toxic waste disposal problems because excess and unused sealant often contains toxic materials such as Chromium.

A number of attempts have been made at developing automated or semi-automated methods for coating rivets and fasteners over the past 30 years, but all were either unsuccessful or suffer from significant shortcomings.

What is needed is an improved fastener suitable for use in airplane manufacture that does not require the expensive, wasteful, and time-consuming wet installation methods presently in use. Also needed are methods of producing such fasteners in commercially viable quantities.

SUMMARY OF THE INVENTION

An object of the invention, therefore, is to provide a fastener suitable for use in airplane manufacture or repair that does not require the expensive, wasteful, and time-consuming wet installation methods presently in use. A fastener according to a preferred embodiment of the present invention is coated with a pre-mixed moisture cure sealant. The sealant layer is coated with a frangible moisture barrier that will break apart when the fastener is installed, thus exposing the sealant to atmospheric moisture. Once exposed to moisture, the sealant will begin to cure. Preferred embodiments also provide a moisture indicator that provides a visual indication that the outer moisture resistant layer has been damaged.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF PREFERRED EMBODIMENTS

Preferred embodiments of the present invention provide self-sealing fasteners suitable for use in airplane manufacture and methods of producing such fasteners. Various efforts have been made to provide self-sealing fasteners or other methods of sealant application to replace the expensive, wasteful, and time-consuming wet installation methods presently in use. But the present inventor is not aware of any commercially successful self-sealing fasteners that have the sealant properties required by aerospace construction. Accordingly, the present invention is believed to satisfy a long-felt need in the aerospace construction industry.

A fastener according to a preferred embodiment of the present invention is coated with a pre-mixed sealant, which preferably cures in the presence of moisture. The sealant layer is then coated with a frangible moisture barrier. The moisture barrier will break apart when the fastener is installed, thus exposing the sealant to atmospheric moisture. Once exposed to moisture, the sealant will begin to cure. The use of self-sealing fasteners according to some embodiments of the present invention could result in a tremendous savings of time and costs associated with aircraft manufacture and repair. Preferred embodiments also provide a moisture indicator that provides a visual indication that the outer moisture resistant layer has been damaged to prevent the use of rivets having a sealant layer that has already cured.

A preferred method or apparatus of the present invention has many novel aspects. Because the invention can be embodied in different methods or apparatuses for different purposes, not every aspect need be present in every embodiment. Moreover, many of the aspects of the described embodiments may be separately patentable. The figures described below are generally schematic and do not necessarily portray the embodiments of the invention in proper proportion or scale. Further, although much of the description below is directed at rivet-type fasteners, the present invention could be applied to any type of fastener that must be sealed before installation, including, for example, screws, bolts, nuts, bushings, spacers, washers, faying surfaces, rivets, and clamps.

Figure 1:
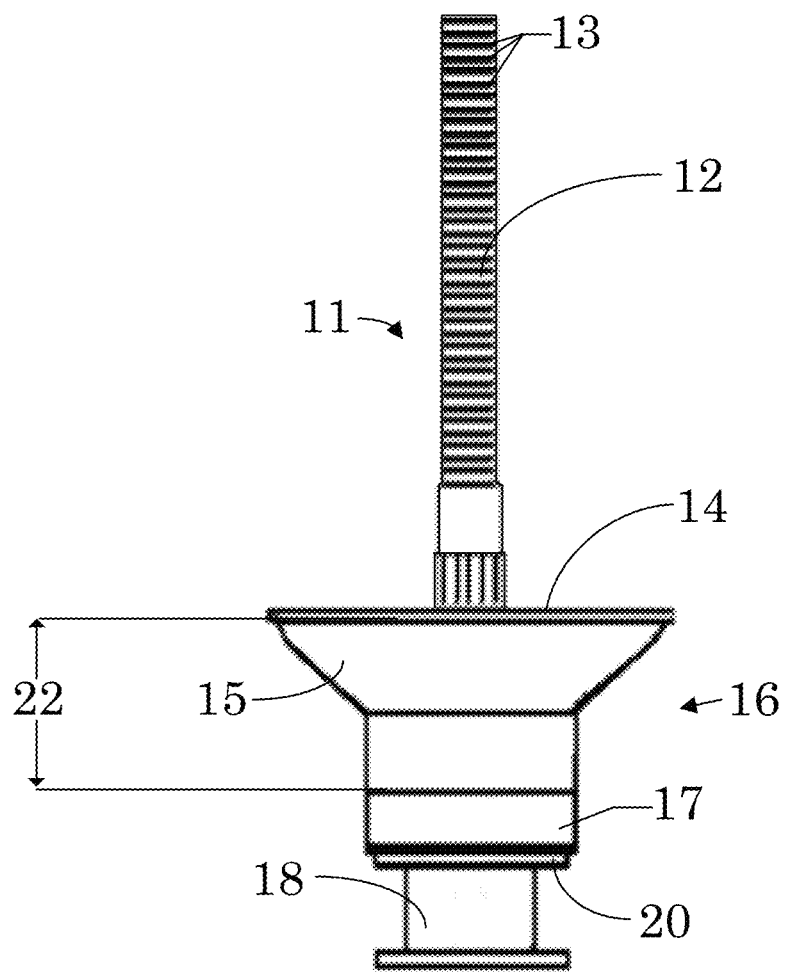
FIG. 1 shows a typical prior art aerospace fastener.

FIG. 1 shows a typical prior art fastener used for aircraft construction and repair. Such fasteners are described, for example, in U.S. Pat. No. 4,012,984, which is hereby incorporated by reference. The uninstalled blind rivet assembly shown in FIG. 1 consists of a hollow tubular sleeve with an enlarged rivet head 15 on one end and a tail portion 17 on the other end. Rivet stem 11 extends through sleeve 16 and has an upper pulling portion or mandrel 12 and a lower stem tail portion 18. The distance shown by reference number 22 represents the maximum grip of the fastener. The total thickness of the plates or other workpieces to be fastened together must be less than distance 22. The grip varies depending upon the length and type of fastener used.

Figure 2:
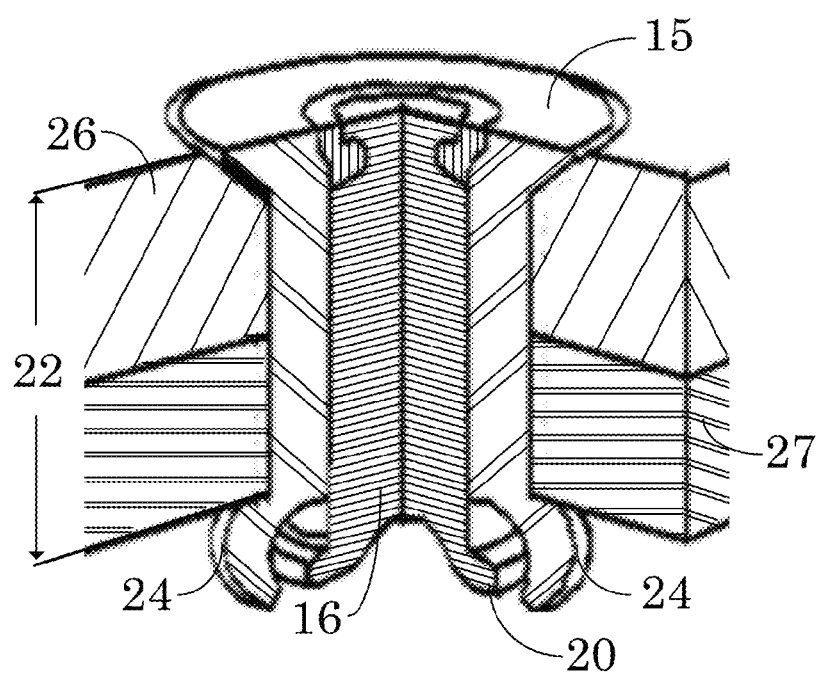
FIG. 2 shows a cross section of an installed prior art rivet-type fastener.

These types of rivet fasteners are often used to hold two metal plates or two pieces of sheet metal together as shown in FIG. 2. As discussed above, when this type of fastener is used in aerospace applications, the outer sleeve of the rivet must be coated with a mixed sealant (typically by hand). The coated rivet is then inserted into a drilled (and in this case countersunk) hole through the two plates 26 and 27 an installation tool (not shown) is slipped over the mandrel 12 so that the installation tool's pulling head can grip the serrations 13 on the mandrel 12. With the installation tool pushing down against a removable washer or anvil 14 on top of the rivet head, the tool then begins to pull the rivet stem 11 upward. As the stem is pulled upward, the stem shear ring 20 located on the stem tail portion is pulled against the tail portion of the rivet sleeve. Referring also to FIG. 2, this causes the sleeve tail portion 17 to buckle and form an expanded bubble 24, which presses against the underside of the plates 26 and 27 to hold the rivet in place and to cinch the plates together. Continued pulling by the installation tool causes the mandrel 12 to fracture and break away, leaving the rivet head flush with the upper surface of the top plate. A cross section of an installed rivet is shown in FIG. 2. When the sealant-coated rivet is installed, sealant should be seen extruded out from under the entire periphery of the rivet head to insure that there was adequate sealant coverage.

A. Sealant

According to the present invention, aerospace fasteners such as the rivets shown in FIGS. 1 and 2 are coated with a pre-mixed layer of a one-part sealant, which preferably cures in the presence of moisture. Preferred sealants are thiol-functional polymers such as polysulfides or polythioethers. The present invention can make use of any one-part moisture-curing polymer that has the characteristics required for use as an aerospace sealant.

Aerospace sealants are normally two-part, room temperature vulcanization (RTV) materials where the product is mixed, applied and allowed to cure under ambient conditions. As used herein, the term "ambient conditions" refers to the conditions typically present in an airplane manufacturing facility. In a two-part sealant, the first part (usually referred to as "part A") typically consists of the curing polymer (such as liquid polysulfide) along with various fillers, plastisizers, adhesion promoters, etc. The second part (Part B) contains the curing agent along with accelerators/retarders to speed up or slow down the curing process, dyes to help visually determine whether mixing is complete and other various fillers and plastisizers. Once the two parts have been thoroughly mixed together, the cure process is started and the sealant will begin to harden.

Although one-part sealants are known, in most aerospace applications two-part sealants are used because of their better storage stability and superior curing properties. In a one part sealant, the curing polymer and the cross linking (curing) agent which are necessary for curing are stored in the same container, but the curing process does not start until the composition is exposed to moisture.

One-part moisture curing polysulfide sealants are known and are available, for example, from W.R. Meadows under the brand name "Seal-Tight." However, no one-part moisture curing sealants are currently approved for use as an aerospace fastener sealant. Aircraft manufacturing, whether military or civilian, requires adherence to strict standards and certifications. Standards are set forth by industry recognized professional organizations (e.g. National Aerospace Standard (NAS) or SAE International) or are established by the Department of Defense or industry leaders. The certification process for new sealants can be very lengthy and expensive. For this reason, it is desirable to use sealants that are already approved for aerospace use, such as sealants meeting the AMS-3276 standard (for fuel tank and general use sealant compounds), the AMS-3277 standard (for fast-curing polythioether sealing compounds, or the AMS-3281 standard (for polysulfide sealing compounds). These standards are available from SAE International and are incorporated by reference.

Sealants currently in use in airplane manufacturing that meet these standards are two part sealants. Accordingly, it is preferable to convert these existing two-part sealants to a one-part sealant for use in the present invention. Thiol-terminated sulfur-containing polymers are known to be well suited for use in aerospace sealants due to their fuel resistant nature upon cross-linking. A number of known and widely used two-part thiol-terminated polymers can be converted to one-part sealants by using the silylation process described below.

For example, probably the most common fastener sealant used in aerospace applications is liquid polysulfide. The general structure of the liquid polysulfide polymer is: HS—(C2H4-O—CH2-O—C2H4—S—S)n-C2H4-O—CH2-O—C2H4-SH. The value of the repeat unit n, which is generally in a range of 5 to 50, governs the viscosity of the polymer. Two-part polysulfide polymers typically use oxygen-donating materials such as manganese dioxide ($MnO_2$) to effect a cure. The curing agent surrenders oxygen, which reacts with the terminal thiol (—SH) groups of the polysulfide polymer. The curing mechanism can be expressed as:

A suitable polysulfide polymer for use in the present invention is Permapol® P5 (PR1776) available from PRC-DeSoto International.

Polythioether polymers are also widely used in aerospace applications. Like polysulfide polymers, polythioethers have functional thiol (—SH) groups that can react with a curing agent, especially an epoxy resin, to cure the polymer. An example of a suitable polythioether polymer for use in the present invention is Permapol® P3.1 (PR2001B) available from PRC-DeSoto International. The general structure of the P3.1 polythioether is:

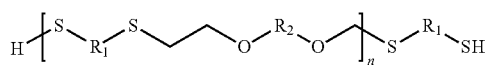

The reaction of the thiol-terminated polymer with an epoxy resin can be expressed simply as:

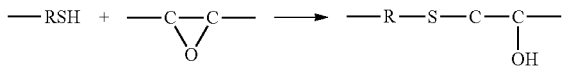

In order to use either a polysulfide or a polythioether polymer as a one-part sealant according to the present invention, it is first necessary to cure-block the polymer to prevent it from curing in the presence of the appropriate curing agent. A preferred method of cure-blocking either of these thiol-terminated polymers is to use a silylation process that blocks the reactivity of the thiol functional group with a silicon containing molecule. The polymer resin (either a polysulfide or a polythioether) is combined with a silylating agent such as hexamethyl disilazane (HMDS) in the presence of imidazole and heated to 150° C. in an inert atmosphere for 6-8 hours. The reaction produces ammonia ($NH_3$) and a trimethylsilyl thioether-terminated polymer where the —SH groups of the original polymer have been replaced with —S—Si—($CH_3$)$_3$.

Figure 3:
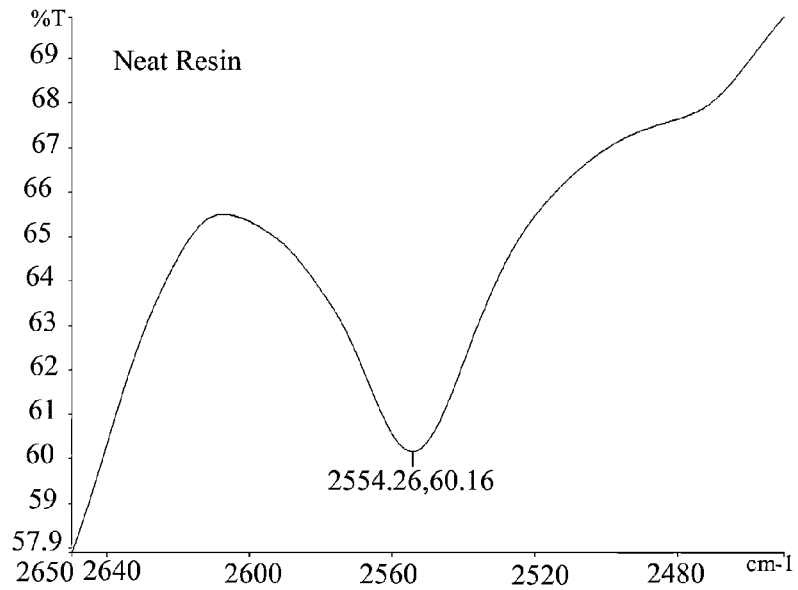
FIG. 3 shows an IR spectrum of the neat PR2001B polythioether.
Figure 4:
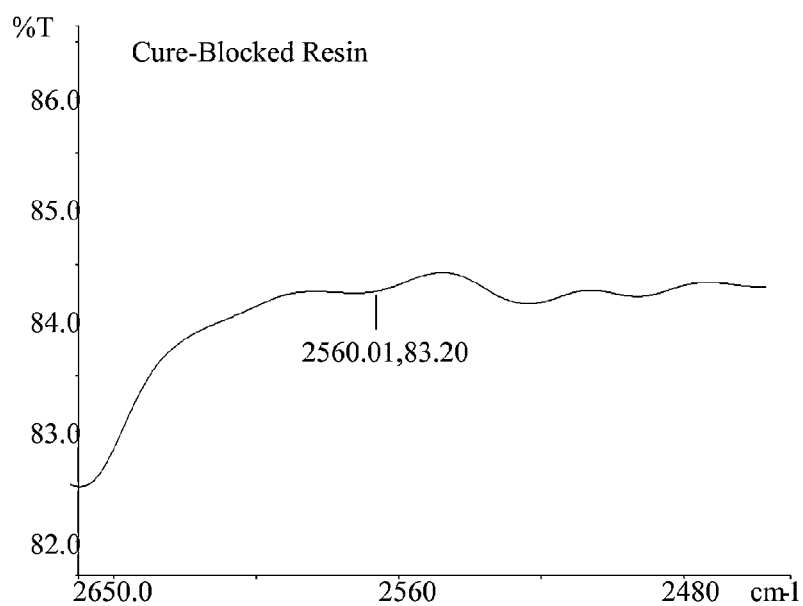
FIG. 4 shows an IR spectrum of the silylated PR2001B polythioether.
Figure 6:
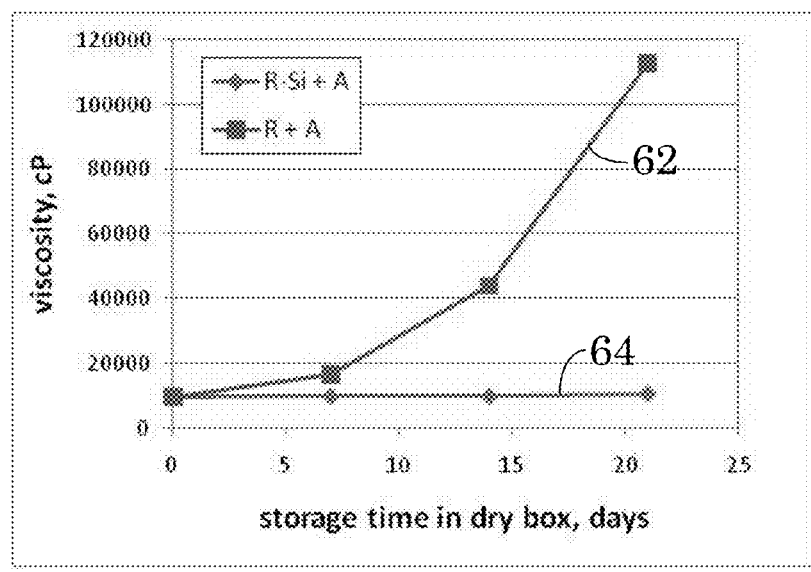
FIG. 6 shows a graph comparing elapsed storage time to viscosity for unblocked resin combined with the curing agent and for the blocked resin combined with the curing agent.

IR Spectroscopy can be used to confirm the blocking reaction. For example, the IR spectrum of the neat PR2001B polythioether shown in FIG. 3 shows a pronounced peak corresponding to the presence of the thiol group. After silylation, however, the IR spectrum of FIG. 4 shows that the thiol peak has disappeared due to the replacement of the active thiols with trimethylsilyl groups. Similar spectra can be observed for the neat and silylated polysulfide resins showing that the polysulfide thiol group is also replaced during silylation. For both polymers, silylation blocks the curing reactions discussed above. As a result, the blocked polymers can be mixed with the appropriate curing agent (MnO2 for the polysulfide or epoxide for the polythioether) without curing. This is confirmed by the table shown in FIG. 6 which compares elapsed storage time to viscosity for unblocked resin combined with the curing agent (shown by line 62) and for the blocked resin combined with the curing agent (shown by line 64). Both were stored in a dry box with only 16-20 ppm $H_2O$. At 20 days, the blocked resin and curing agent combination still maintained a low viscosity (no curing) while the combined unblocked resin was completely cured.

Figure 5:
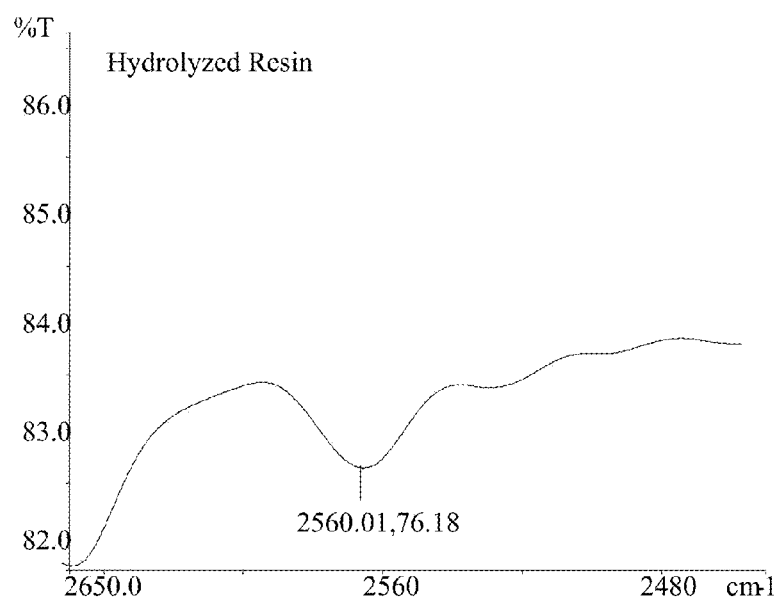
FIG. 5 shows an IR spectrum of the hydrolyzed PR2001B polythioether.

The —S—Si— chemical bond can be easily cleaved by hydrolysis upon exposure to even small amounts of $H_2O$. On contact with moisture, even the small amount of moisture present in ambient air, the trimethylsilyl group will be replaced by the original thiol (—SH) group. The IR spectrum in FIG. 5 shows a silylated resin that has been exposed to atmospheric moisture. When compared to FIGS. 3 and 4, it can be seen that the peak corresponding to the thiol group has reappeared in FIG. 5 upon the hydrolysis of the trimethylsilyl-blocking group.

Persons of skill in the art will recognize that other blocking agents could be used in some situations to achieve the same moisture sensitive blocking, including for example other silylating agents, carboxylic acid, tetrahydropyran or furan, methoxyethoxymethyl or similar moisture labile groups.

B. Moisture Barrier

Once a suitable moisture sensitive cure-block has been effected, and the blocked polymer mixed with the appropriate curing agent, the resulting one-part moisture curing sealant will rapidly "un-block" and cure if exposed to moisture. As a result, it is necessary to protect the sealant from exposure to moisture until the fastener is in place. This is preferably accomplished by coating the sealant with a size coat that functions as a moisture barrier. In a preferred embodiment, the size coat is a protective layer of a polymer or similar material that is tough enough to survive routine handling of fasteners during production and transportation, but brittle or frangible enough that the layer will break apart (preferably pulverize) upon the application of the fastener installation force so that the sealant will be allowed to cure once the fastener is in place. In this application, the terms "size coat" and "moisture barrier" will be used interchangeably.

In one preferred embodiment, a suitable size coat is a nanocomposite of polystyrene resin and nanoclay, such as Cloisite® nanoclay commercially available from Southern Clay Products, Inc. Polystyrene alone acts as a moisture barrier, but still allows atmospheric moisture to penetrate. The addition of the nanoclay further slows moisture penetration by creating a "tortuous path" that diffusing water molecules must take to pass through the nanocomposite layer because of the presence of a large number of nanoclay barrier particles. The use of polymer nanocomposites is discussed by Sridhar et al., "Barrier Properties of Polymer Nanocomposites," Ind. Eng. Chem. Res., vol. 45, 8282-89 (2006), which is incorporated by reference. The clay is also anhydrous and absorbs some of the penetrating moisture. A mixture of about 5% nanoclay can reduce moisture penetration by a factor of about 5 times.

Once disadvantage of the use of a polystyrene nanocomposite is that the mixture is typically deposited from a dilute solution and then heated to drive off the volatile solvent. Any heating must be very carefully controlled to avoid any unintentional curing of the one-part solvent underneath the size coat.

In another preferred embodiment, the size coat/moisture barrier is a UV curable or visible light (actinic radiation curable) polymer nanocomposite composition comprising an acid ester; an acrylic oligomer; a multi-functional (meth) acrylate monomer; and a layered inorganic silicate. By using a UV or visible curable composition, the problem of heat related premature curing of the sealant is avoided. Additionally, because this composition is 100% solids (no solvent solution) it can be deposited in a thick layer (as compared to the polystyrene nanocomposite) in one pass. Actinic curing of coatings can occur in less than one second, allowing for extremely rapid manufacture of the present invention. Suitable compositions also maintain the brittleness of the polystyrene nanocomposite so that the polymer nanocomposite composition layer will also pulverize under the force of fastener installation.

Suitable acid esters are either a monofunctional acid ester or a trifunctional acid ester, or a mixture thereof. Preferably, the acid ester has an acid number greater than 130 mg KOH/g and less than 195 mg KOH/g, inclusively and is present in an amount from about 5 to about 25 percent by weight.

A suitable acrylic oligomer would be, for example, epoxy acrylate, urethane acrylate, polyester acrylate, polyether acrylate, amine modified polyether acrylate, acrylic acrylate, or a combination thereof. Preferably, the acrylic oligomer is present in an amount from about 40 to about 60 percent by weight.

A suitable multi-functional (meth)acrylate monomer would be, for example, 1,12 dodecanediol dimethacrylate; 1,4-butanediol diacrylate; 1,4-butanediol dimethacrylate; 1,6-hexanediol diacrylate; 1,6 hexanediol dimethacrylate; diethylene glycol diacrylate; diethylene glycol dimethacrylate; dipropylene glycol diacrylate; dipropylene glycol dimethacrylate; ethylene glycol diacrylate; ethylene glycol dimethacrylate; polyethylene glycol diacrylate; polyethylene glycol dimethacrylate; 1,3-butylene glycol diacrylate; 1,3-butylene glycol dimethacrylate; neopentyl glycol diacrylate; neopentyl glycol dimethacrylate; cyclohexane dimethanol diacrylate; cyclohexane dimethanol dimethacrylate; ethoxylated bisphenol A diacrylate, trimethylolpropane triacrylate, pentaerythritol triacrylate, pentaerythritol tetraacrylate, and mixtures thereof. Preferably, the multi-functional (meth)acrylate monomer is present in an amount from about 25 to about 40 percent by weight.

A suitable layered silicate would be a phyllosilicate, such as bentonite; vermiculite; montmorillonite; nontronite; beidellite; volkonskoite; hectorite; saponite; sauconite; magadiite; kanyaite; ledikite and mixtures thereof. Preferably, the layered silicate is present in an amount from about 0 to about 12 percent by weight.

C. Moisture Indicator

In preferred embodiments, a moisture indicator coating can also be applied underneath the outer size coat to give a visual indication that moisture has penetrated the size coat and thus that the fastener should not be used. A number of known compounds change color in the presence of moisture, including for example cobalt chloride, which produces a deep red color when exposed to moisture. In some cases, certain moisture indicators may undesirably interact with the sealant and give a false positive color change. For this reason, it is preferable to deposit a very thin size coating over the sealant before the moisture indicator coating is applied.

D. Applying Self-Sealing Coating to Fasteners

In combination, the layers discussed above, the sealant, the size coat, and the optional moisture indicator layer, can be collectively referred to as a self-sealing coating. As Applicants are using the word "coating" it is understood that in applying such a self-sealing coating the multiple constituent layers may be deposited separately. Also, the constituent layers may be deposited in multiple thinner layers or all at once.

Figure 7:
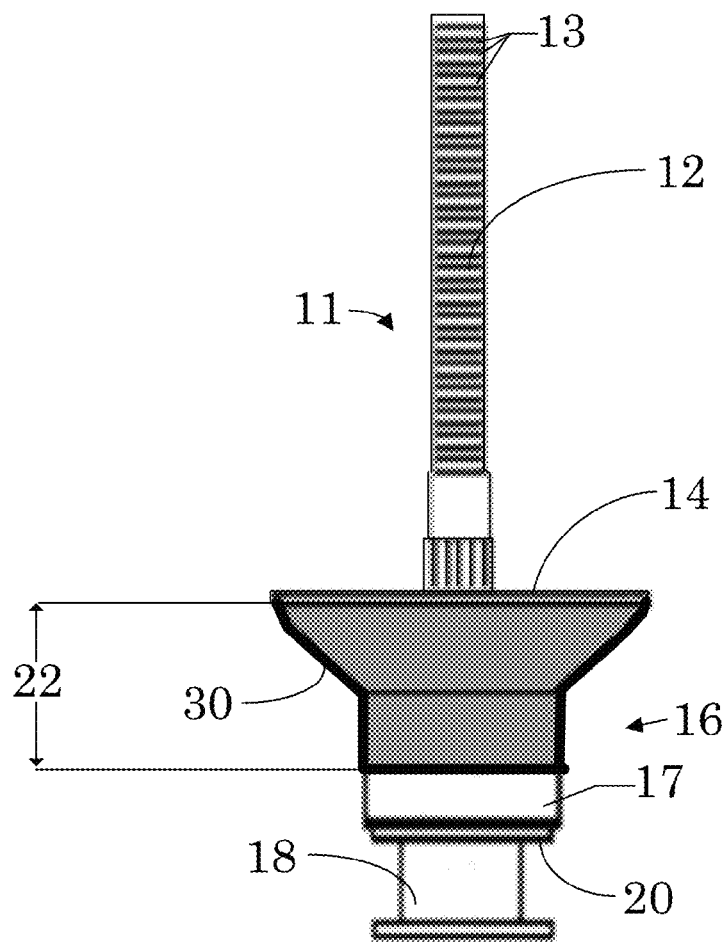
FIG. 7 shows the prior art fastener of FIG. 1 with a self-sealing coating according to the present invention.
Figure 8:
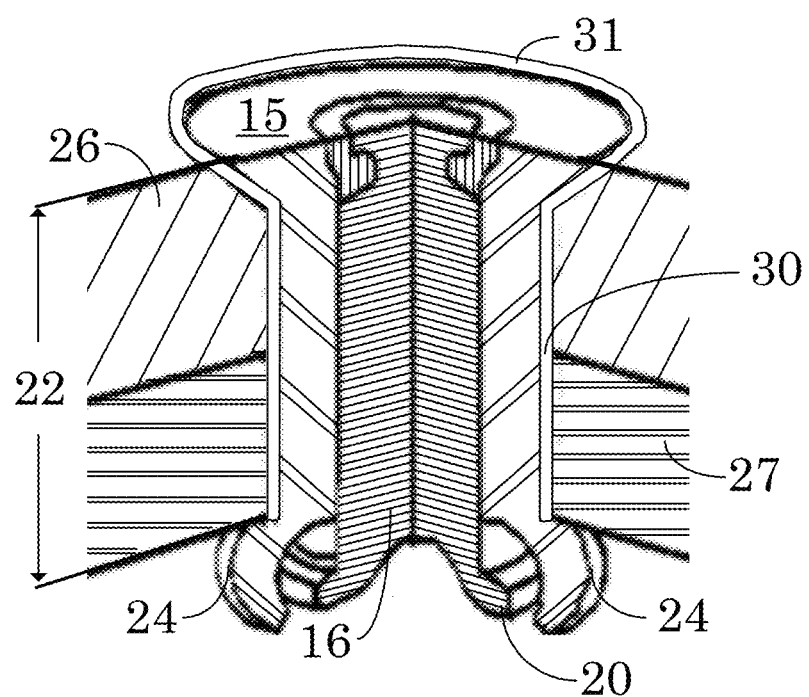
FIG. 8 shows a cross-section view of an installed self-sealing fastener according to the present invention.

FIG. 7 shows the prior art fastener of FIG. 1 with a self-sealing coating 30 deposited onto the sleeve 16. FIG. 8 shows a cross-section of the fastener of FIG. 2 to which a self-sealing coating 30 was applied before installation. The coating 30 should entirely cover the portion of the sleeve that will be within the drilled hole in the workpiece (layers 26 and 27) into which the fastener will be installed. In the fastener of FIG. 7, the self-sealing coating extends the entire grip distance 22 from the top of the fastener head (under the anvil 14) to the lower sleeve tail 17. The coating can also be applied to the portion of the sleeve that will extend below the workpiece for ease of production, but this is not required. The entire coating (including the sealant and size coat) is preferably approximately 3 mils ($7.6 \times 10^{-4}$ mm) thick. More preferably, the sealant layer will be thick enough so that when the fastener is installed, a small amount of sealant will extrude between the fastener head and the upper surface of the top layer 26 (as shown by reference number 31 in FIG. 8) to give a visual indication that enough sealant is present. Extruded sealant will preferably be visible around the entire circumference of the fastener head. Fasteners with a self-sealing coating can be installed into pre-drilled holes by any suitable prior art fastener installation means, including standard hand or powered riveters or rivet guns or fully automated riveting machines.

Figure 9:
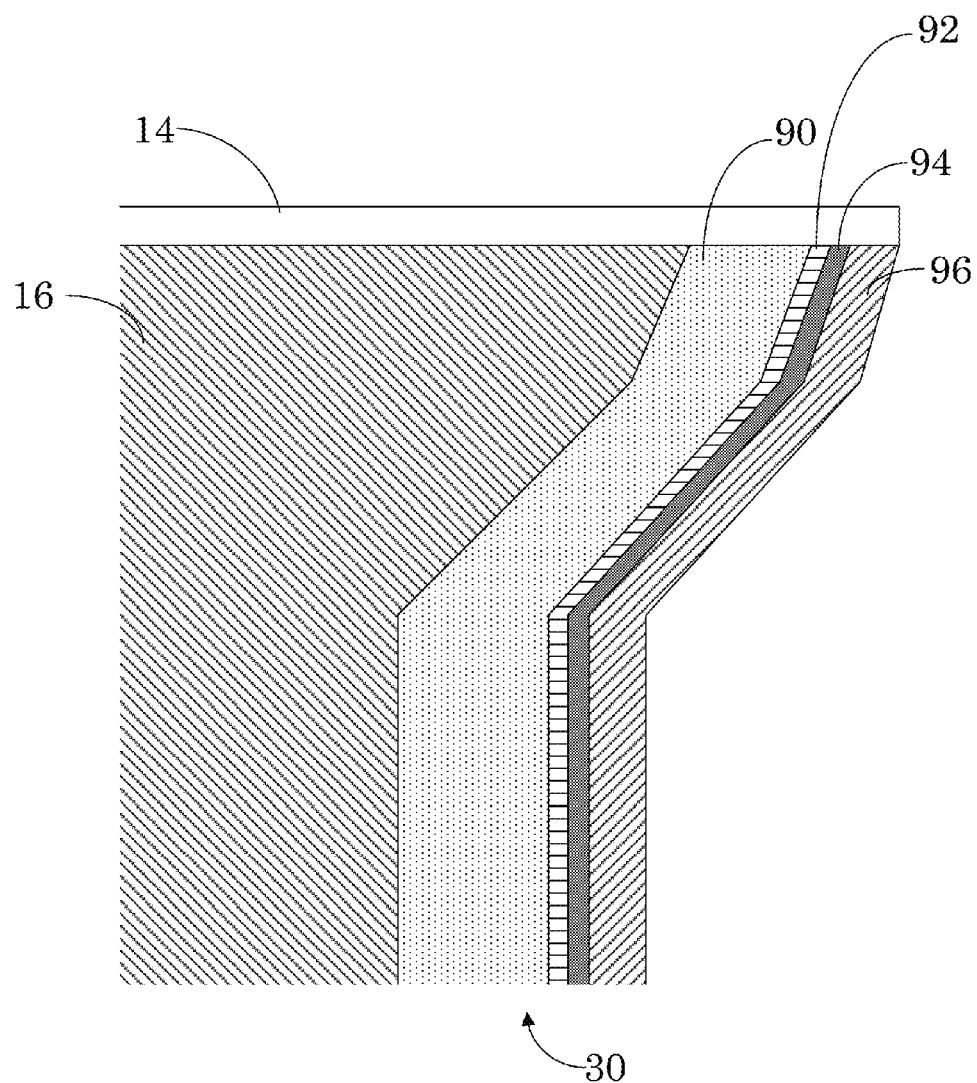
FIG. 9 shows a cross-section view of the self-sealing coating according to the present invention showing the individual layers.
Figure 10:
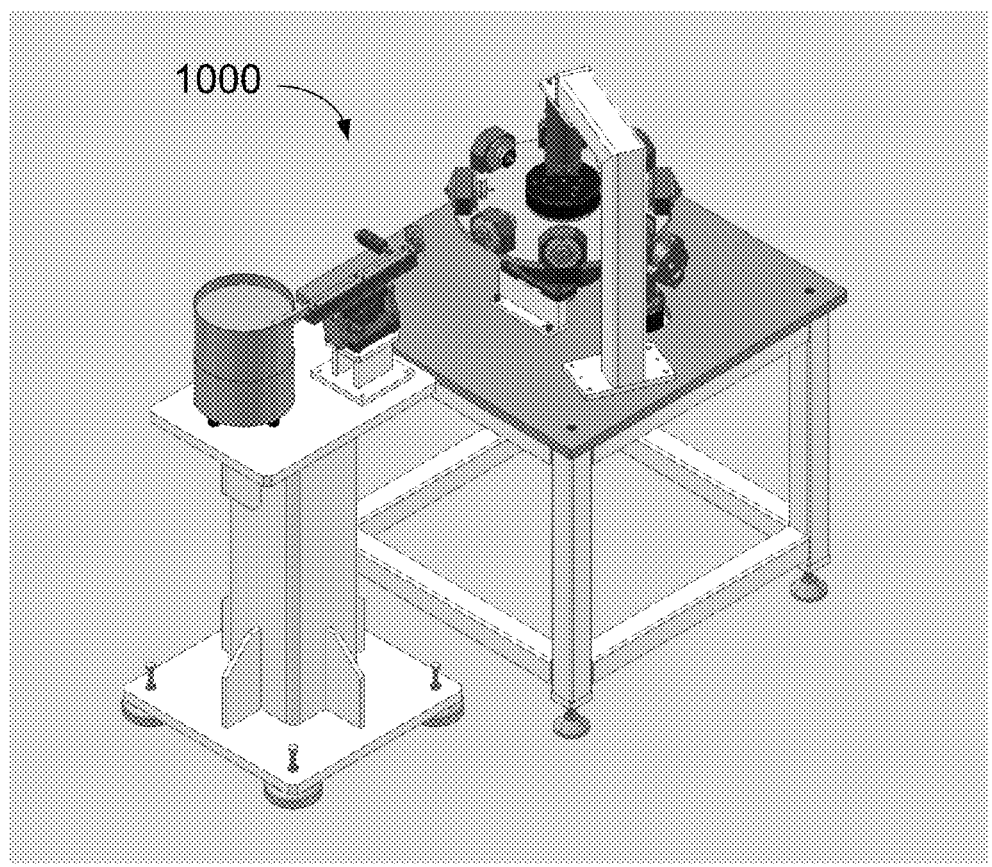
FIG. 10 shows an automated carousel-based machine capable of producing the self-sealing fasteners of the present invention.
Figure 11:
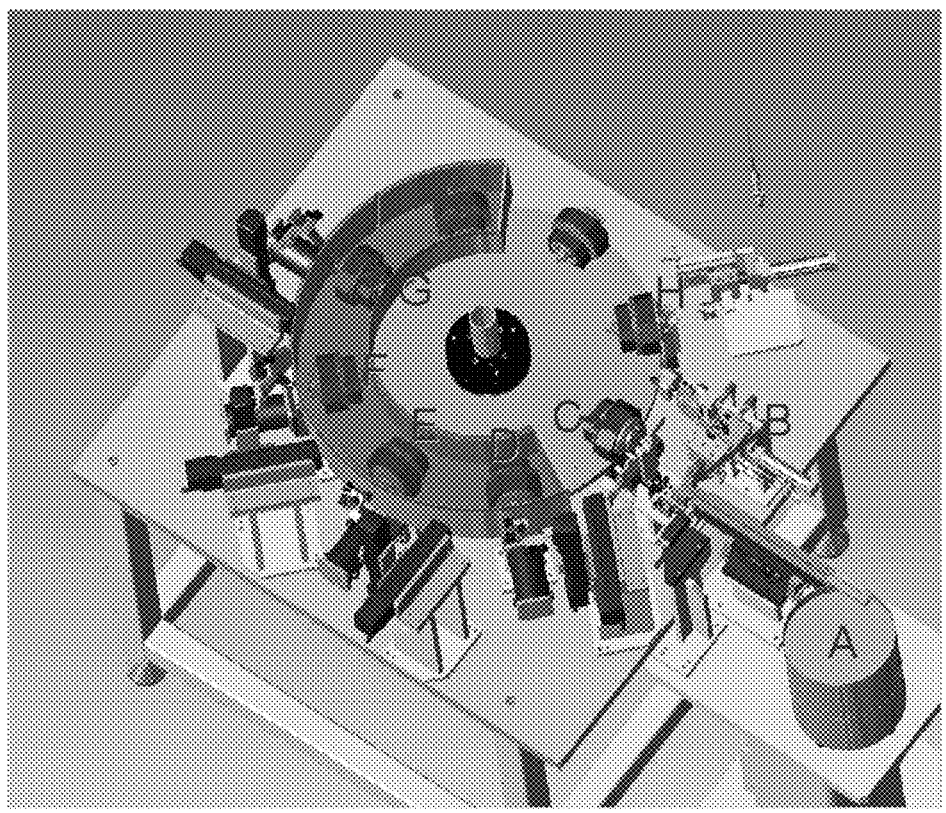
FIG. 11 shows an overhead view of an automated machine capable of producing the self-sealing fasteners of the present invention.
Figure 12:
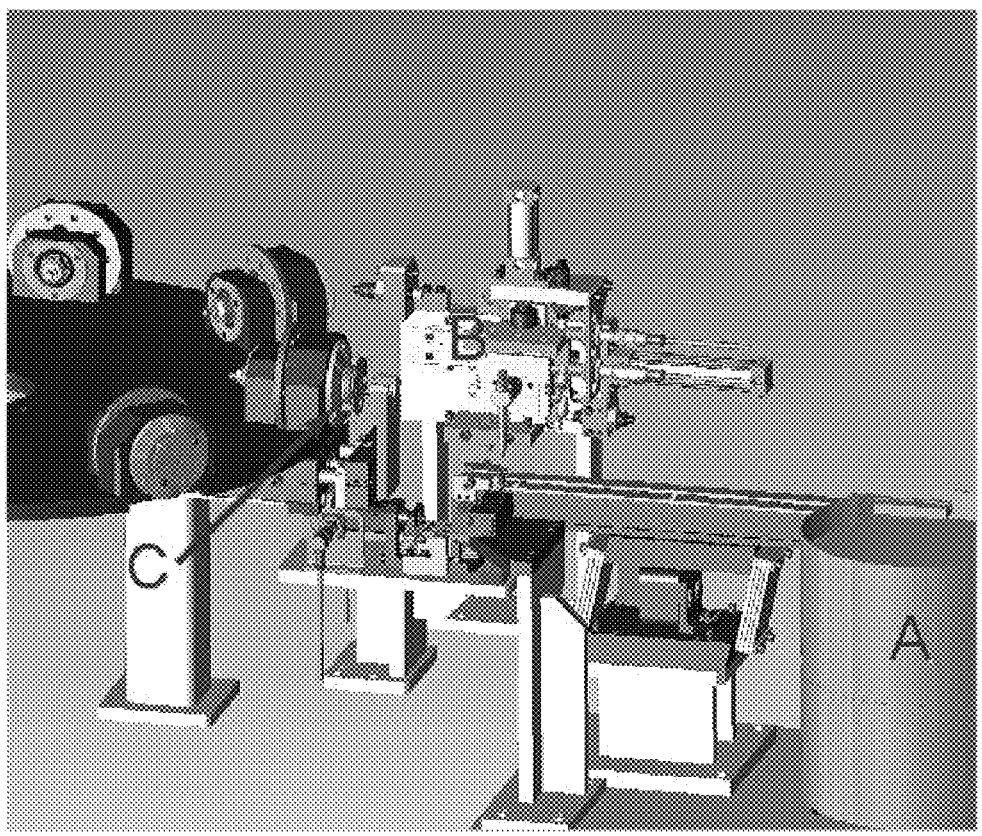
FIG. 12 shows a side view of the fastener pick and feed assembly of an automated machine capable of producing the self-sealing fasteners of the present invention.
Figure 13:
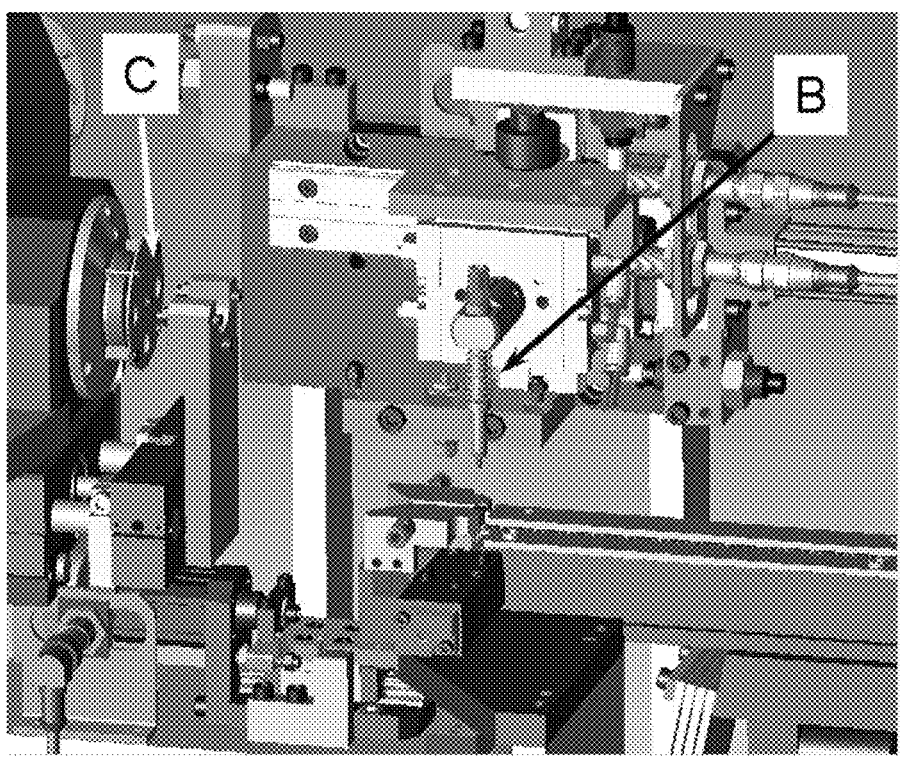
FIG. 13 shows another side view of the fastener pick and feed assembly of an automated machine capable of producing the self-sealing fasteners of the present invention.
Figure 14:
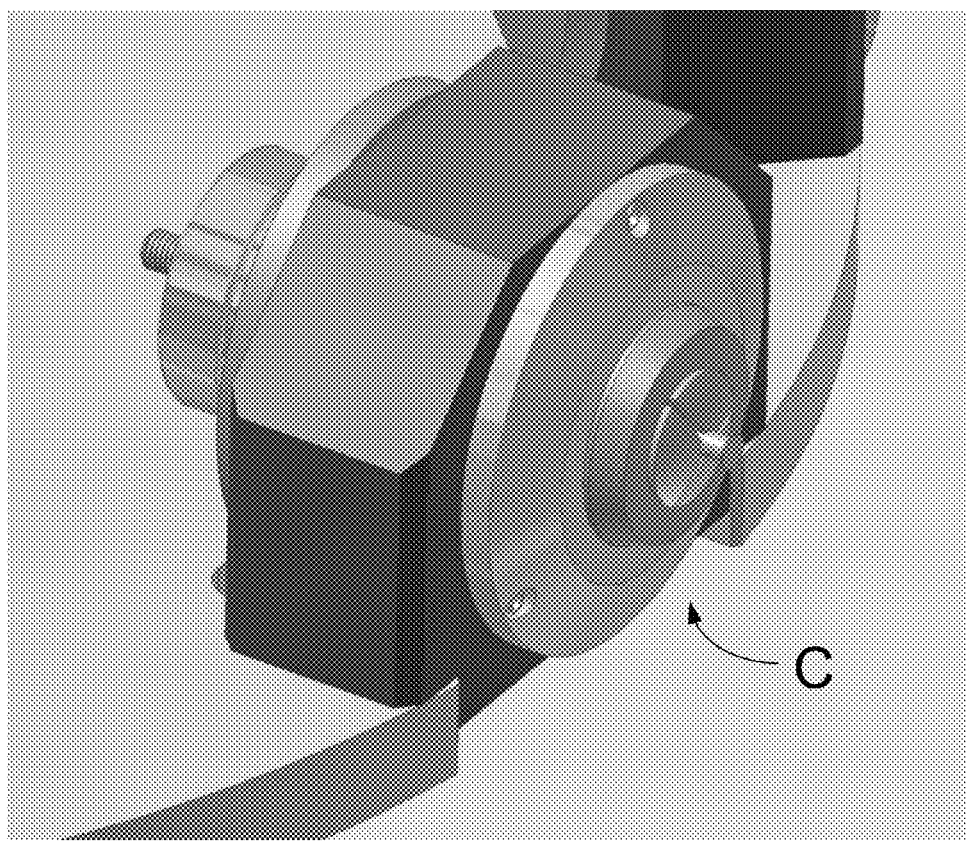
FIG. 14 shows a collet for use with an automated machine capable of producing the self-sealing fasteners of the present invention.

FIG. 9 is a cross-section of the self-sealing coating 30 showing the component layers. In a preferred embodiment, a fastener with self-sealing coating 30 could be produced by applying a suitable one-part moisture curing sealant layer 90, as described in detail above, over at least the grip depth of the fastener. The deposited sealant layer is then optionally overlaid with a thin size coat 92, followed by an optional coating of a moisture indicator 94. The thin size coat layer 92 should be cured without curing the sealant 90 underneath. The sealant 90 (plus the optional moisture indicator 94 if desired) is then completely covered with a final size coat 96 such as the polystyrene nanocomposite or UV curable polymer nanocomposite composition described above. The final size coat 96 should also be cured without curing the sealant 90.

To produce fasteners according to the present invention in commercial quantities, each layer can be deposited (one layer at a time) with an electronic fluid dispenser onto fasteners which are chucked into a collet rotating at high-speed (for example, 1200 rpm). The production process can also be automated with a multi-station machine 1000, as shown in FIGS. 10-14, that accepts fasteners from a bowl feeder (A) and transfers them by way of a fastener pick and feed assembly (B) to a collet (C) situated on a rotating table (I). The table rotates to position the fastener at a first station (D) for applying the pre-mixed one-part sealant. The table then rotates to the second station (E) for the application of the size coat and to a third station (F) for quick-curing the size coat (for example, using UV light). Finally, the table can rotate to a fourth station (H) where the finished (now self-sealing) fastener is offloaded for packaging. Optionally, additional stations (G) could be added to apply the thin initial size coat and moisture indicator. Persons of skill in the art will recognize that as a fastener is moved to the second station, another fastener can be loaded into the first station. The process can continue until all stations are occupied. Each table rotation serves to unload each station and transfer the unloaded fastener to the next station. As completed fasteners are offloaded, new fasteners are moved to the first station to start the process. Preferably the multi-station production machine can be calibrated by setting desired fastener spin rates and fluid delivery speeds, adjusting the intensity and time of the cure mechanisms, and synchronizing the self-sealing fastener rate to the packaging feed rate.

The scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The figures described herein are generally schematic and do not necessarily portray the embodiments of the invention in proper proportion or scale.

We claim:

1. A fastener pre-coated with a sealant comprising:
   a fastener;
   a coating of an uncured sealant applied to at least a portion of the fastener surface, said sealant comprising a one-part sealant that cures when exposed to moisture; and
   a protective layer covering the surface of the uncured sealant and preventing moisture from reaching the uncured sealant, the protective coating being sufficiently brittle that the protective layer will fracture when the fastener is installed allowing atmospheric moisture to reach the uncured sealant and initiate sealant curing.

2. The fastener of claim 1 in which said uncured sealant is cure-blocked with a moisture removable blocking group.

3. The fastener of claim 1 in which the uncured sealant comprises a polysulfide sealant.

4. The fastener of claim 3 in which the uncured sealant comprises a polythioether sealant.

5. The fastener of claim 3 in which the polythioether sealant comprises a mixture of an epoxy resin and a polythioether polymer in which the thiol functional group has been blocked with a moisture-removable chemical group.

6. The fastener of claim 3 in which the moisture-removable blocking group comprises a hydrolyzable silyl group or trimethylsilyl group.

7. The fastener of claim 3 in which the moisture-removable blocking group comprises a silyl group which hydrolyzes in the presence of moisture to form a thiol group.

8. The fastener of claim 1 in which the fastener comprises a rivet having a head and a shank and in which the uncured sealant coating covers at least a portion of the rivet shank underneath the rivet head.

9. The fastener of claim 8 in which the coating of an uncured sealant applied to at least a portion of the fastener surface comprises a coating of an uncured sealant having a sufficient thickness so that, when the fastener is installed and the sealant is cured, the sealant will provide a seal between the head of the fastener and an upper surface of the part to which the fastener is fastened.

10. The fastener of claim 8 in which the coating of an uncured sealant applied to at least a portion of the fastener surface comprises a coating of uncured sealant applied uniformly around the shank of the fastener having a sufficient volume that when the fastener is installed into a workpiece a small amount of sealant visibly extrudes completely around the fastener head.

11. A method of producing a self-sealing fastener, the fastener having a head and shank, and the method comprising:
    applying a coating of an uncured sealant to at least a portion of the fastener shank, said sealant comprising a one-part sealant that cures when exposed to moisture; and
    covering the surface of the uncured sealant with a protective layer that prevents moisture from reaching the uncured sealant underneath the protective layer, the protective layer being sufficiently brittle that the protective layer will fracture when the fastener is installed allowing atmospheric moisture to reach the uncured sealant and initiate sealant curing.

12. The method of claim 11 further comprising, after applying the uncured sealant to the shank of the fastener, applying a coating of a moisture indicator that provide a visual indication when exposed to moisture.

13. The method of claim 11 in which the uncured sealant comprises a polysulfide sealant.

14. The method of claim 11 in which the uncured sealant comprises a polythioether sealant.

15. The method of claim 14 in which polythioether sealant comprises a mixture of an epoxy resin and a polythioether polymer in which the thiol functional group has been blocked with a moisture removable chemical group.

16. The method of claim 11 in which said uncured sealant is cure-blocked with a moisture-removable blocking group.

17. The fastener of claim 16 in which the moisture-removable blocking group comprises a hydrolyzable silyl group or trimethylsilyl group.

18. The method of claim 16 in which the moisture-removable blocking group comprises a silyl group that hydrolyzes in the presence of moisture to form a thiol group.

19. The method of claim 11 in which applying a coating of an uncured sealant to at least a portion of the fastener shank comprises applying a coating of an uncured sealant having a sufficient thickness so that, when the fastener is installed and the sealant is cured, the sealant will provide a seal between a head of the fastener and an upper surface of the part to which the fastener is fastened.

20. The method of claim 11 in which applying a coating of an uncured sealant to at least a portion of the fastener shank comprises applying a sufficient volume of uncured sealant uniformly around the shank of the fastener so that when the fastener is installed into a workpiece a small amount of sealant visibly extrudes completely around the fastener head.

* * * * *